(12) United States Patent
Li et al.

(10) Patent No.: US 12,513,640 B2
(45) Date of Patent: Dec. 30, 2025

(54) METHOD FOR TIMING ADVANCE REPORTING IN NTN, METHOD FOR TIMING ADVANCE RECEIVING IN NTN, AND DEVICE

(71) Applicant: GUANGDONG OPPO MOBILE TELECOMMUNICATIONS CORP., LTD., Guangdong (CN)

(72) Inventors: Haitao Li, Guangdong (CN); Yi Hu, Guangdong (CN); Xinlei Yu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 427 days.

(21) Appl. No.: 18/146,417

(22) Filed: Dec. 26, 2022

(65) Prior Publication Data

US 2023/0269686 A1 Aug. 24, 2023

Related U.S. Application Data

(63) Continuation of application No. PCT/CN2020/129854, filed on Nov. 18, 2020.

(51) Int. Cl.
*H04W 4/00* (2018.01)
*H04W 56/00* (2009.01)
(Continued)

(52) U.S. Cl.
CPC .......... *H04W 56/0045* (2013.01); *H04W 74/0833* (2013.01); *H04W 74/0836* (2024.01); *H04W 84/06* (2013.01)

(58) Field of Classification Search
CPC .......... H04W 74/0833; H04W 84/06
See application file for complete search history.

(56) References Cited

U.S. PATENT DOCUMENTS

2018/0242306 A1* 8/2018 Wong ................. H04W 68/005
2018/0279358 A1* 9/2018 Babaei ............. H04W 72/0453
2020/0092685 A1* 3/2020 Fehrenbach .......... H04W 36/08
(Continued)

FOREIGN PATENT DOCUMENTS

CN 103052095 4/2013
CN 104270810 1/2015
(Continued)

OTHER PUBLICATIONS

EPO, Extended European Search Report for EP Application No. 20961893.3, Dec. 12, 2023.
(Continued)

*Primary Examiner* — Elisabeth Benoit Magloire
(74) *Attorney, Agent, or Firm* — Hodgson Russ LLP

(57) ABSTRACT

The disclosure discloses a method for timing advance (TA) reporting in a non-terrestrial network (NTN), a method for TA receiving in an NTN, and a device. The method for TA reporting in the NTN includes the following. Indication information is received from a network device, where the indication information indicates whether the terminal reports uplink (UL) TA information in a UL message in a random access procedure or whether the terminal is allowed to report the UL TA information in the UL message in the random access procedure. The terminal reports or skips reporting the UL TA information in the UL message in the random access procedure according to the indication information.

10 Claims, 6 Drawing Sheets

(51) Int. Cl.
*H04W 74/0833* (2024.01)
*H04W 74/0836* (2024.01)
*H04W 84/06* (2009.01)

(56) References Cited

U.S. PATENT DOCUMENTS

| | | | |
|---|---|---|---|
| 2020/0351801 | A1 | 11/2020 | Jeon et al. |
| 2021/0194571 | A1* | 6/2021 | Ma ..................... H04B 7/18504 |
| 2022/0086780 | A1* | 3/2022 | Tsai ..................... H04W 56/006 |
| 2022/0132347 | A1* | 4/2022 | Chang .................. H04W 24/02 |
| 2022/0210802 | A1* | 6/2022 | Hwang ................. H04L 5/0053 |
| 2022/0321240 | A1* | 10/2022 | Zhang .................. H04W 72/20 |
| 2022/0408384 | A1* | 12/2022 | Määttanen ........ H04W 56/0045 |
| 2023/0217529 | A1* | 7/2023 | Xu ........................ H04W 72/12 370/329 |
| 2023/0217531 | A1* | 7/2023 | Yao ...................... H04W 76/27 370/328 |

FOREIGN PATENT DOCUMENTS

| | | |
|---|---|---|
| CN | 109005563 | 12/2018 |
| CN | 110536341 | 12/2019 |
| CN | 111586582 | 8/2020 |
| CN | 111615215 | 9/2020 |
| WO | 2019147010 | 8/2019 |
| WO | 2020031120 | 2/2020 |
| WO | 2020034564 | 2/2020 |

OTHER PUBLICATIONS

Interdigital, "Summary of [Post111-e][908][NTN] RACH and HARQ feedback aspects," e3GPP RAN WG2 Meeting #112e, R2-2010455, Nov. 2020.
WIPO, International Search Report and Written Opinion for International Application No. PCT/CN2020/129854, Aug. 2, 2021.

* cited by examiner

METHOD FOR TIMING ADVANCE REPORTING IN NTN, METHOD FOR TIMING ADVANCE RECEIVING IN NTN, AND DEVICE

CROSS REFERENCE TO RELATED APPLICATION(S)

This application is a continuation of International Application No. PCT/CN2020/129854, filed Nov. 18, 2020, the entire disclosure of which is incorporated herein by reference.

TECHNICAL FIELD

The disclosure relates to the field of mobile communication, and more particularly, to a method for timing advance (TA) reporting in a non-terrestrial network (NTN), a method for TA receiving in an NTN, and a device.

BACKGROUND

The random access procedure is important in mobile communication.

In the random access procedure, to ensure the orthogonality of uplink (UL) transmission, the network device requires that signals transmitted from different terminals at the same time but in different frequency-domain resources arrive at the network device at approximately the same time. To ensure time synchronization at the network device side, the new radio (NR) system supports a UL timing advance (TA) mechanism.

The terminal can usually estimate a pre-compensation value of transmission of a random access preamble in time domain according to location information and ephemeris information etc. However, the network device is unable to obtain the specific location of the terminal and the pre-compensation value adopted by the terminal. Therefore, after the random access procedure, the network device cannot know exact UL TA information of the terminal.

SUMMARY

According to an aspect of the disclosure, a method for timing advance (TA) reporting in a non-terrestrial network (NTN) is provided. The method is applied to a terminal and includes the following. Indication information is received from a network device, where the indication information indicates whether the terminal reports uplink (UL) TA information in a UL message in a random access procedure or whether the terminal is allowed to report the UL TA information in the UL message in the random access procedure. The terminal reports or skips reporting the UL TA information in the UL message in the random access procedure according to the indication information.

According to an aspect of the disclosure, a method for TA receiving in an NTN is provided. The method is applied to a network device and includes the following. Indication information is transmitted to a terminal, where the indication information indicates whether the terminal reports UL TA information in a UL message in a random access procedure or whether the terminal is allowed to report the UL TA information in the UL message in the random access procedure. The UL message transmitted by the terminal in the random access procedure is received.

According to an aspect of the disclosure, a terminal is provided. The terminal includes a processor, a transceiver connected with the processor, and a memory configured to store executable instructions. The processor is configured to load and execute the executable instructions to perform the method for TA reporting in the NTN according to the above aspect.

According to an aspect of the disclosure, a network device is provided. The network device includes a processor, a transceiver connected with the processor, and a memory configured to store executable instructions. The processor is configured to load and execute the executable instructions to perform the method for TA receiving in the NTN according to the above aspect.

BRIEF DESCRIPTION OF THE DRAWINGS

In order to more clearly illustrate technical solutions in implementations of the disclosure, the following will briefly introduce drawings required for description of implementations. Obviously, the drawings in the following description merely illustrate some implementations of the disclosure. For those of ordinary skill in the art, other drawings can be obtained from these drawings without creative work.

DETAILED DESCRIPTION

Figure 1:
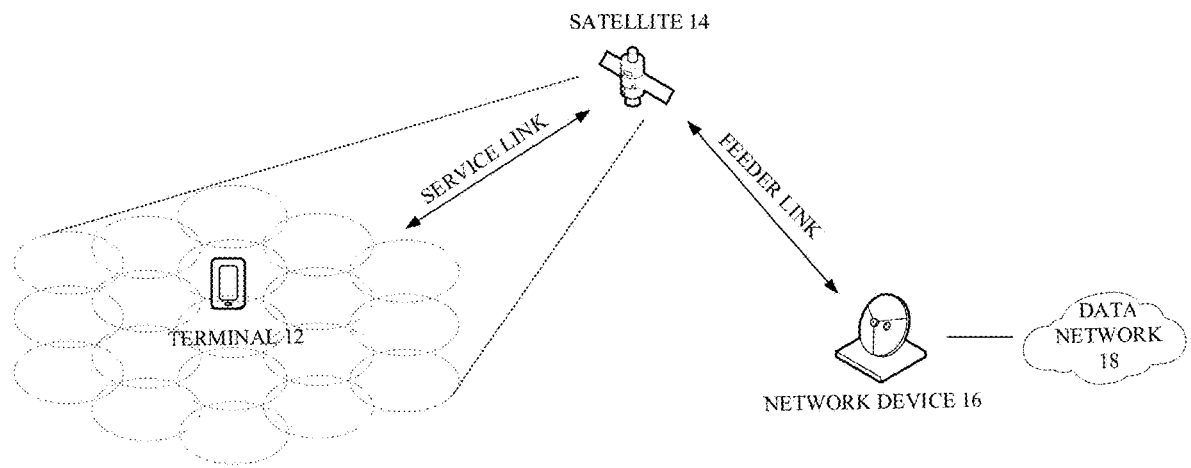
FIG. 1 is a diagram illustrating a network architecture of a transparent payload non-terrestrial network (NTN) provided in exemplary implementations of the disclosure.

In order to make purposes, technical solutions, and advantages of the disclosure clearer, implementations of the disclosure will be further described in detail below with reference to accompanying drawings.

At present, non-terrestrial network (NTN) technologies are studied by the third generation partnership project (3GPP). The NTN technology generally provides communication services to terrestrial users through satellite communication. Compared with terrestrial cellular network communication, the satellite communication has many unique advantages. First, the satellite communication is not constrained by areas of the users. For example, terrestrial communication is not able to cover sparsely populated areas as well as areas where communication devices cannot be set up, such as oceans, mountains, and deserts. In contrast, for the satellite communication, one satellite can cover a large area, and the satellite can orbit the earth, therefore, in theory, every corner on the earth can be covered for satellite communication. Second, the satellite communication has greater social value. Remote mountainous areas, poor and backward countries or regions can be covered for satellite communication at a low cost, so that people in these areas can enjoy advanced voice communication and mobile internet technologies, thereby narrowing a digital gap with developed areas and promoting the development of these areas. Third, a satellite has a long communication distance, and a communication cost thereof does not increase greatly with the increase of the communication distance. Finally, the satellite communication has high stability and is not constrained by natural disasters.

Communication satellites are classified into low-earth orbit (LEO) satellites, medium-earth orbit (MEO) satellites, geostationary earth orbit (GEO) satellites, high elliptical orbit (HEO) satellites, and the like according to different orbital altitudes. At present, LEO and GEO are mainly studied.

1. LEO

For the LEO satellite, the orbital altitude thereof is in the range of 500 km to 1500 km, a corresponding orbital period is about 1.5 hours to 2 hours, and signal propagation delay of single-hop communication between users is generally less than 20 ms. A satellite has a maximum visibility time of 20 minutes, a short signal propagation distance, and a less link loss is small, and does not have high transmission power requirements for a user terminal.

2. GEO

For the GEO satellite, the orbital altitude thereof is 35786 km, a rotation period around the earth thereof is 24 hours, and signal propagation delay of single-hop communication between users is generally 250 ms.

In order to ensure the coverage of the satellite and increase the system capacity of the entire satellite communication system, the satellite uses multi-beams to cover the ground. One satellite can provide dozens of or even hundreds of beams for ground coverage, and one beam can cover a ground area with a diameter of tens to hundreds of kilometers.

Figure 2:
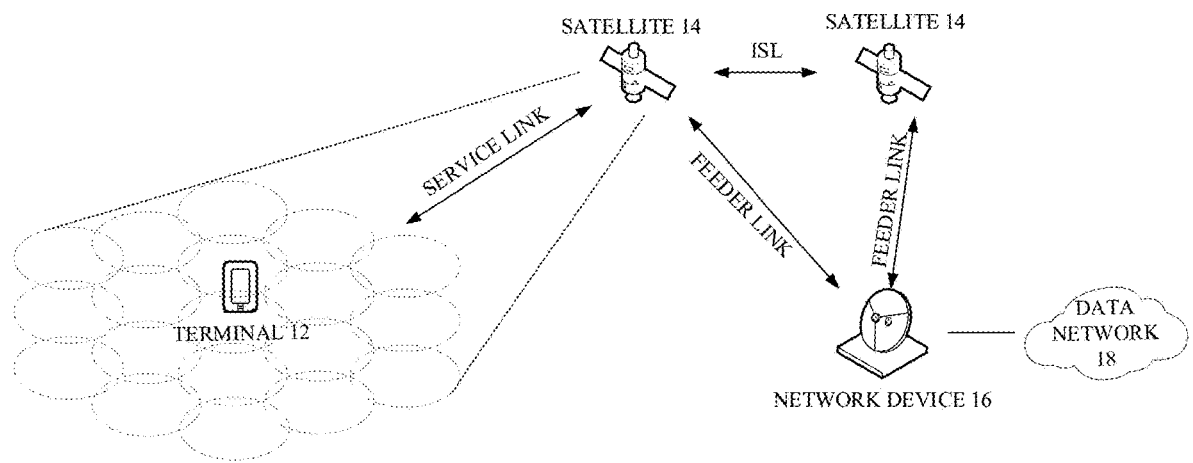
FIG. 2 is a diagram illustrating a network architecture of a regenerative payload NTN provided in exemplary implementations of the disclosure.

There are at least two NTN scenarios: transparent payload NTN and regenerative payload NTN. FIG. 1 illustrates the scenario of transparent payload NTN, and FIG. 2 illustrates the scenario of regenerative payload NTN.

An NTN consists of the following network elements:

One or more gateways for connecting a satellite with a terrestrial public network.

A feeder link for communication between the gateway and the satellite.

A service link for communication between a terminal and the satellite.

A satellite which can be classified into a transparent payload satellite and a regenerative payload satellite in terms of the function provided by the satellite.

A transparent payload which only provides the function of radio frequency filtering, frequency conversion and amplification, and only provides transparent forwarding of a signal, and a waveform signal forwarded is un-changed.

A regenerative payload which, in addition to the function of radio frequency filtering, frequency conversion and amplification, also provides the function of demodulation/decoding, routing/switch, coding/modulation and has all or part of network device functions.

Inter-satellite links (ISL) which exists in the regenerative payload scenario.

Schematically, as illustrated in FIGS. 1 and 2, in these two NTN scenarios, a network device 16 may be a base station. The base station is a device for providing wireless communication functions for a terminal. The base station may include macro base stations, micro base stations, relay stations, access points, and the like in various forms. In systems adopting different radio access technologies, devices with base station functions may have different names. For example, in a long term evolution (LTE) system, such devices are referred to as eNodeB or eNB, and in a fifth generation (5G) new radio in unlicensed spectrum (NR-U) system, such devices are referred to as gNodeB or gNB. The name "base station" may change with evolution of communication technologies. In implementations of the disclosure, the device for providing wireless communication functions for a terminal 14 are collectively referred to as network devices.

A random access procedure refers to a procedure from when a terminal transmits a random access preamble in an attempt to access a network to when a basic signaling connection is established between the terminal and the network. The random access procedure is used for the terminal to establish data communication with the network side. In NR, two types of random access procedures are mainly supported: a type-1 random access procedure and a type-2 random access procedure.

1. Type-1 Random Access Procedure (4-Step Random Access Procedure).

The type-1 random access procedure mainly includes the following.

Step 1, a terminal transmits message 1 (msg1), i.e., a random access preamble, to a network device.

The terminal transmits a selected random access preamble on a time-frequency resource in a selected physical random access channel (PRACH). The network device can estimate an uplink (UL) timing and a grant size required for the terminal to transmit message 3 (msg3) based on the random access preamble.

Step 2, the network device transmits message 2 (msg2), i.e., a random access response (RAR), to the terminal.

After transmitting the message 1, the terminal starts a RAR window and monitors a physical downlink control channel (PDCCH) in the RAR window. The PDCCH is scrambled with a random access radio network temporary identifier (RA-RNTI).

After successfully monitoring the PDCCH scrambled with the RA-RNTI, the terminal can obtain a physical downlink shared channel (PDSCH) scheduled by the PDCCH, where the PDSCH carries the RAR.

The RAR contains a backoff indicator (BI) indicating a backoff time to retransmit the message 1, a random access preamble identifier (RAPID) indicating the random access preamble, a timing advance group (TAG) for adjusting the UL timing, a UL grant for scheduling a UL resource indication for the message 3, a temporary cell-radio network temporary identity (C-RNTI) for scrambling PDCCH for message 4 (msg4) (initial access).

Step 3, the terminal transmits message 3, i.e., scheduled transmission, to the network device.

The message 3 is mainly used to inform the network device of an event that triggers the random access procedure. For example, if the event is an initial access random procedure, the message 3 will carry a UE identity (ID) and an establishment cause, and if the event is radio resource control (RRC) reestablishment, the message 3 will carry a connected-state-UE ID and an establishment cause.

Step 4, the network device transmits message 4, i.e., a contention resolution message, to the terminal. The message 4 is used for conflict resolution.

Step 5, the terminal transmits message 5 (msg5), i.e., connection setup complete, to the network device.

The message 5 is mainly used to inform the network device of random access connection setup complete.

2. Type-2 Random Access Procedure (2-Step Random Access Procedure).

In a contention-based random access procedure, the 4-step random access procedure can be simplified into a 2-step random access procedure. Such 2-step random access procedure involves message A (msgA), message B (msgB), and the following.

Step 1, a terminal transmits message A to a network device.

Step 2, after receiving the message A transmitted by the terminal, the network device transmits message B to the terminal.

Optionally, the message A contains the content of the message 1 and the message 3, that is, the message A contains a random access preamble and a UE ID, where the UE ID may be one of a C-RNTI, a temporary C-RNTI, a RA-RNTI, and a non-access stratum (NAS) UE ID. Optionally, the message B contains the content of the message 2 and the message 4, that is, the message B contains a RAR and a contention resolution message.

Figure 3:
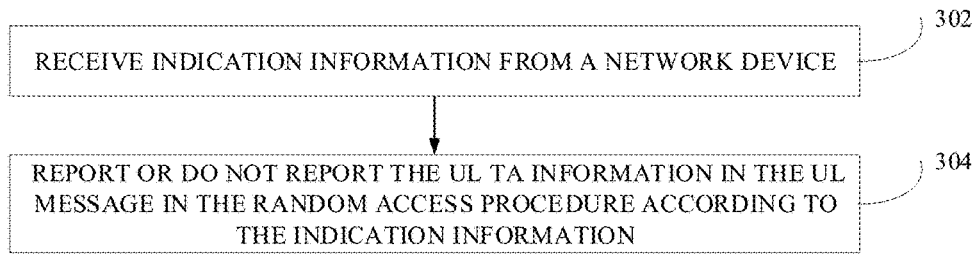
FIG. 3 is a flowchart of a method for timing advance (TA) reporting in an NTN provided in exemplary implementations of the disclosure.

FIG. 3 illustrates a flowchart of a method for timing advance (TA) reporting in an NTN provided in exemplary implementations of the disclosure. In these implementations, for example, the method is applied to a terminal. Optionally, the terminal supports the NTN. The method includes the following.

Step 302, the terminal receives indication information from a network device.

The indication information is a signaling transmitted by the network device to the terminal. Schematically, the indication information indicates whether the terminal reports UL TA information in a UL message in a random access procedure or whether the terminal is allowed to report the UL TA information in the UL message in the random access procedure.

Schematically, the indication information is carried in a RRC dedicated signaling or a system message broadcast.

Schematically, according to the description of the above two types of random access procedures, the UL message in the random access procedure includes any of: a message 3 in a type-1 random access procedure, a message 5 in the type-1 random access procedure, and a message A in a type-2 random access procedure.

The message 3 in the type-1 random access procedure is mainly used to inform the network device of an event that triggers the random access procedure, and the message 3 contains a UE ID and an establishment cause or carries the UE ID and the establishment cause. The message 5 in the type-1 random access procedure is mainly used to inform the network device of random access connection setup complete. The message A in the type-2 random access procedure contains a random access preamble and a UE ID, where the UE ID may be one of a C-RNTI, a temporary C-RNTI, a RA-RNTI, and a NAS UE ID.

According to the classification of the UL message, the indication information may indicate only a certain message, or indicate all messages. Schematically, the indication information may be classified into the following two types according to different functions.

(1) the Indication Information Indicates a Certain UL Message in the Random Access Procedure.

The indication information indicates one of: whether the terminal reports the UL TA information in the message 3, whether the terminal reports the UL TA information in the message 5, whether the terminal reports the UL TA information in the message A, whether the terminal is allowed to report the UL TA information in the message 3, whether the terminal is allowed to report the UL TA information in the message 5, or whether the terminal is allowed to report the UL TA information in the message A.

(2) the Indication Information Uniformly Indicates all UL Messages or any UL Message in the Random Access Procedure.

The indication information indicates whether the terminal reports the UL TA information in any of the message 3, the message 5, and the message A, or whether the terminal is allowed to report the UL TA information in any of the message 3, the message 5, and the message A.

When any of the above two types of indication information is adopted, it is the network device who determines whether to allow the terminal device to report the UL TA information. Such determination can be made by the network device based on any configuration information or operational requirement related to the random access procedure.

Schematically, the network device determines the indication information according to the configuration of a serving cell of the terminal, where the configuration of the serving cell of the terminal includes configuration related to random access resources. Schematically, the network device may also determine whether to allow to report the UL TA information according to at least one of a coverage of the serving cell, a distance between the terminal and a satellite, and a distance between the terminal and the network device. For example, when the network device determines that the coverage of the serving cell is small, the indication information indicates that the UL TA information is not allowed to be reported.

For example, the network device transmits a RRC dedicated signaling to the terminal, where the RRC dedicated signaling carries indication information, and the indication information indicates whether the terminal reports the UL TA information in the message 3. For another example, the network device transmits a system message broadcast to the terminal, where the system message broadcast carries indication information, and the indication information indicates whether the terminal is allowed to report the UL TA information in any of the message 3, the message 5, and the message A.

According to the above, the procedure of receiving and transmitting other messages in the random access procedure will not be repeated herein.

Step 304, the terminal reports or does not report the UL TA information in the UL message in the random access procedure according to the indication information.

The time when the UL message transmitted by the terminal to the network device arrives at the network device is affected by factors such as distance. Therefore, there is a delay in signal transmission. To ensure time synchronization at the network device side, a terminal far from the network device usually need to transmit the UL message earlier than a terminal closer to the network device. The UL TA information is carried in the UL message and refers to a relative value transmitted by the terminal to the network device and indicating a phase position of the terminal.

Schematically, the UL TA information includes at least one of: a UL TA, a first round trip delay (RTD) between the terminal and a satellite, a second RTD between the terminal and the network device, and a delta value relative to a common RTD.

The UL TA value is determined according to a distance from the terminal to the satellite. The RTD value is obtained according to the real time differential (RTD) technology. The principle of this technology is: the network device or the satellite transmits a pseudo-range (or coordinate) correction value (also referred to as a differential value) to the terminal, and the terminal estimates a precise location of the terminal according to the correction value and an observation value of the terminal. Therefore, the RTD value can be used to obtain the precise location of the terminal dynamically in real time and for relative positioning. Schematically, the first RTD is obtained according to a pseudo-range (or coordinate) correction value (also referred to as a differential value) transmitted by the satellite to the terminal, and the second RTD is obtained according to a pseudo-range (or coordinate) correction value (also referred to as a differential value) transmitted by the network device to the terminal. In addition, in exemplary implementations, the common RTD refers to a minimum delay between the terminal and the network device in the cell, where the minimum delay depends on a delay between the terminal and the network device corresponding to satellite overtiming. Schematically, the second RTD is equal to a sum of the common RTD and the delta value.

For example, the network device transmits a RRC dedicated signaling to the terminal, where the RRC dedicated signaling carries indication information, and the indication information indicates that the terminal is allowed to report the UL TA information in the message 3. The terminal reports the first RTD in the UL message, i.e., in the message 3, in the random access procedure according to the indication information.

For another example, the network device transmits a system message broadcast to the terminal, where the system message broadcast carries indication information, and the indication information indicates that the terminal is not allowed to report the UL TA information in any of the message 3, the message 5, and the message A. The terminal will not report the UL TA information in the UL message in the random access procedure according to the indication information.

In conclusion, according to the method provided in these implementations, the network device can dynamically schedule the UL TA information of the terminal by controlling whether to report the TA information. When the network device does not obtain the UL TA information of the terminal, message resources occupied by the terminal for reporting can be reduced, thereby saving resources. When the network device obtains the UL TA information of the terminal, the network device can obtain an exact TA of the terminal, thereby reducing a scheduling delay.

According to the above, during TA reporting in the NTN, the terminal generates a specific UL message according to the indication information, where the UL message may or may not carry the UL TA information of the terminal. According to the classification of the indication information, the terminal may report the UL message in the random access procedure according to at least one of the following methods.

1. The Indication Information Indicates Whether the Terminal Reports the UL TA Information in the UL Message in the Random Access Procedure.

Figure 4:
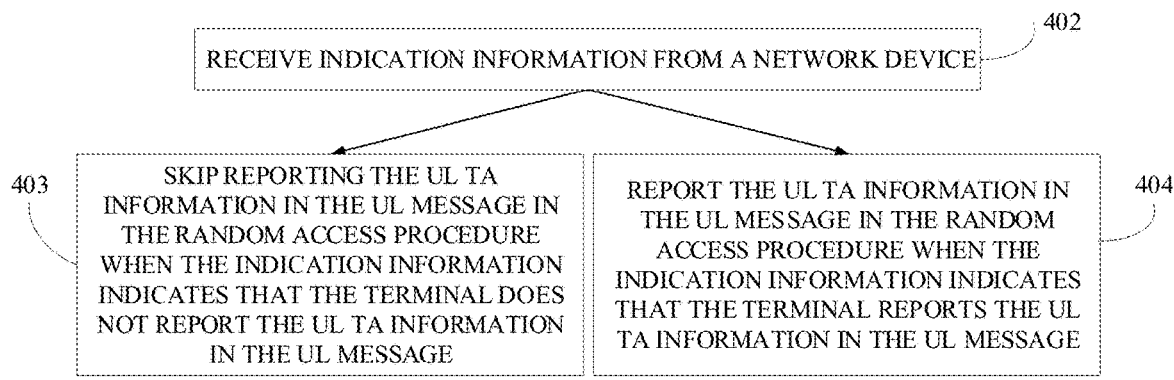
FIG. 4 is a flowchart of a method for TA reporting in an NTN provided in exemplary implementations of the disclosure.

Schematically, as illustrated in FIG. 4, for example, the method is applied to a terminal. Optionally, the terminal supports the NTN. The method includes the following.

Step 402, the terminal receives indication information from a network device.

Schematically, the indication information indicates whether the terminal reports UL TA information in a UL message in a random access procedure. Schematically, the indication information is carried in a RRC dedicated signaling or a system message broadcast.

Schematically, the UL message in the random access procedure includes any of: a message 3 in a type-1 random access procedure, a message 5 in the type-1 random access procedure, and a message A in a type-2 random access procedure.

According to the classification of the UL message, the indication information may indicate only a certain message, or indicate all messages. Schematically, the indication information may be classified into the following two types according to different functions.

(1) the Indication Information Indicates a Certain UL Message in the Random Access Procedure.

The indication information indicates one of: whether the terminal reports the UL TA information in the message 3, whether the terminal reports the UL TA information in the message 5, or whether the terminal reports the UL TA information in the message A.

(2) the Indication Information Uniformly Indicates all UL Messages or any UL Message in the Random Access Procedure.

The indication information indicates whether the terminal reports the UL TA information in any of the message 3, the message 5, and the message A.

According to the above, the procedure of receiving and transmitting other messages in the random access procedure will not be repeated herein.

Step 403, the terminal skips reporting the UL TA information in the UL message in the random access procedure when the indication information indicates that the terminal does not report the UL TA information in the UL message.

Step 404, the terminal reports the UL TA information in the UL message in the random access procedure when the indication information indicates that the terminal reports the UL TA information in the UL message.

Schematically, if the indication information indicates that the terminal reports the UL TA information in the UL message, the terminal generates a media access control (MAC) protocol data unit (MAC PDU) for final transmission by encapsulating, according to a logical channel priority, one or more media access control-control elements (MAC CE) carrying a UL TA together with other data to-be-transmitted, and reports the UL message carrying the UL TA information in the random access procedure.

For example, the network device transmits a RRC dedicated signaling to the terminal, where the RRC dedicated signaling carries indication information, and the indication information indicates that the terminal can report the UL TA information in the message 3. The terminal reports the UL TA information in the UL message, i.e., in the message 3, in the random access procedure according to the indication information, where the UL TA information is the second RTD.

Schematically, only one of step 403 and step 404 can be executed, step 403 and step 404 cannot be executed at the same time. Alternatively, step 403 is executed first, and then step 404 is executed according to updated indication information. Alternatively, step 404 is executed first, and then step 403 is executed according to updated indication information.

2. The Indication Information Indicates Whether the Terminal is Allowed to Report the UL TA Information in the UL Message in the Random Access Procedure.

Figure 5:
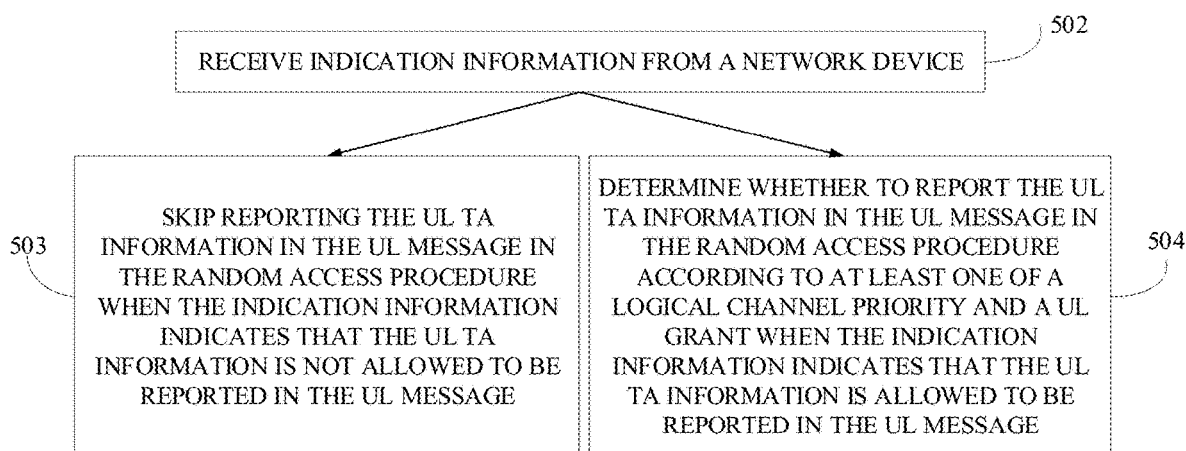
FIG. 5 is a flowchart of a method for TA reporting in an NTN provided in exemplary implementations of the disclosure.

Schematically, as illustrated in FIG. 5, for example, the method is applied to a terminal. Optionally, the terminal supports the NTN. The method includes the following.

Step 502, the terminal receives indication information from a network device.

Schematically, the indication information indicates whether the terminal is allowed to report UL TA information in a UL message in a random access procedure. Schematically, the indication information is carried in a RRC dedicated signaling or a system message broadcast.

Schematically, the UL message in the random access procedure includes any of: a message 3 in a type-1 random access procedure, a message 5 in the type-1 random access procedure, and a message A in a type-2 random access procedure.

According to the classification of the UL message, the indication information may indicate only a certain message, or indicate all messages. Schematically, the indication information may be classified into the following two types according to different functions.

(1) the Indication Information Indicates a Certain UL Message in the Random Access Procedure.

The indication information indicates one of: whether the terminal is allowed to report the UL TA information in the message 3, whether the terminal is allowed to report the UL TA information in the message 5, or whether the terminal is allowed to report the UL TA information in the message A.

(2) the Indication Information Uniformly Indicates all UL Messages or any UL Message in the Random Access Procedure.

The indication information indicates whether the terminal is allowed to report the UL TA information in any of the message 3, the message 5, and the message A.

According to the above, the procedure of receiving and transmitting other messages in the random access procedure will not be repeated herein.

Step 503, the terminal skips reporting the UL TA information in the UL message in the random access procedure when the indication information indicates that the UL TA information is not allowed to be reported in the UL message.

Step 504, the terminal determines whether to report the UL TA information in the UL message in the random access procedure according to at least one of a logical channel priority and a UL grant when the indication information indicates that the UL TA information is allowed to be reported in the UL message.

Schematically, when the indication information indicates that the UL TA information is allowed to be reported in the UL message, in the UL message in the random access procedure, the terminal can make the following two decisions respectively according to at least one of the logical channel priority and the UL grant.

(1) the Terminal Reports the UL TA Information in the Following Cases.

All the data to-be-transmitted are sorted in descending order of the priority of the logical channel to which the UL TA information and the other data to-be-transmitted belong. Whether a UL resource scheduled by the UL grant is large enough to accommodate the UL TA information in the current UL transmission is determined according to the size of respective sorted data to-be-transmitted. When the UL resource indicated by the UL grant is large enough to accommodate the UL TA information, the UL TA information is reported.

The data to-be-transmitted includes at least one of UL data and a MAC CE, and the UL TA information is carried in a certain MAC CE.

(2) the Terminal Skips Reporting the UL TA Information in the Following Cases.

All the data to-be-transmitted are sorted in descending order of the priority of the logical channel to which the UL TA information and the other data to-be-transmitted belong. Whether a UL resource scheduled by the UL grant is large enough to accommodate the UL TA information in the current UL transmission is determined according to the size of respective sorted data to-be-transmitted. When the UL resource indicated by the UL grant is too small to accommodate the UL TA information, the UL TA information will not be reported.

Schematically, only one of step 503 and step 504 can be executed, step 503 and step 504 cannot be executed at the same time. Alternatively, step 503 is executed first, and then step 504 is executed according to updated indication information. Alternatively, step 504 is executed first, and then step 503 is executed according to updated indication information.

In conclusion, according to the method provided in these implementations, the network device can dynamically schedule the UL TA information of the terminal by controlling whether to report the TA information. When the network device does not obtain the UL TA information of the terminal, message resources occupied by the terminal for reporting can be reduced, thereby saving resources. When the network device obtains the UL TA information of the terminal, the network device can obtain an exact TA of the terminal, thereby reducing a scheduling delay.

Figure 6:
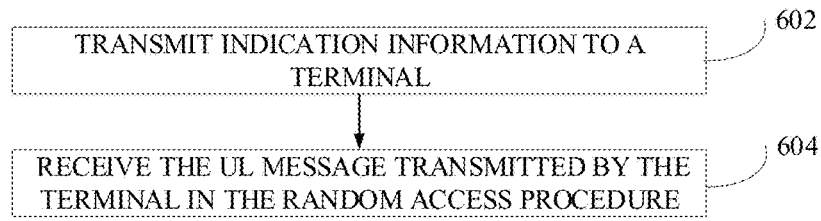
FIG. 6 is a flowchart of a method for TA receiving in an NTN provided in exemplary implementations of the disclosure.

According to the method for TA transmitting in the NTN described above, the network device needs to receive the TA information thus transmitted. Schematically, as illustrated in FIG. 6, a method for TA receiving in an NTN is provided in implementations of the disclosure. The method includes the following.

Step 602, a network device transmits indication information to a terminal.

The indication information is a signaling transmitted by the network device to the terminal. Schematically, the indication information indicates whether the terminal reports UL TA information in a UL message in a random access procedure or whether the terminal is allowed to report the UL TA information in the UL message in the random access procedure. Schematically, the indication information is carried in a RRC dedicated signaling or a system message broadcast.

Schematically, the UL message in the random access procedure includes any of: a message 3 in a type-1 random access procedure, a message 5 in the type-1 random access procedure, and a message A in a type-2 random access procedure.

The message 3 in the type-1 random access procedure is mainly used to inform the network device of an event that triggers the random access procedure, and the message 3 contains a UE ID and an establishment cause or carries the UE ID and the establishment cause. The message 5 in the type-1 random access procedure is mainly used to inform the network device of connection setup complete of random access. The message A in the type-2 random access procedure contains a random access preamble and a UE ID, where the UE ID may be one of a C-RNTI, a temporary C-RNTI, a RA-RNTI, and a NAS UE ID.

According to the classification of the UL message, the indication information may indicate only a certain message, or indicate all messages. Schematically, the indication information may be classified into the following two types according to different functions.

(1) the Indication Information Indicates a Certain UL Message in the Random Access Procedure.

The indication information indicates one of: whether the terminal reports the UL TA information in the message 3, whether the terminal reports the UL TA information in the message 5, whether the terminal reports the UL TA information in the message A, whether the terminal is allowed to report the UL TA information in the message 3, whether the terminal is allowed to report the UL TA information in the message 5, or whether the terminal is allowed to report the UL TA information in the message A.

(2) the Indication Information Uniformly Indicates all UL Messages or any UL Message in the Random Access Procedure.

The indication information indicates whether the terminal reports the UL TA information in any of the message 3, the message 5, and the message A, or whether the terminal is allowed to report the UL TA information in any of the message 3, the message 5, and the message A.

When any of the above two types of indication information is adopted, it is the network device who determines whether to allow the terminal device to report the UL TA information. Such determination can be made by the network device based on any configuration information or operational requirement related to the random access procedure.

Schematically, the network device determines the indication information according to configuration of a serving cell of the terminal, where the configuration of the serving cell of the terminal includes configuration related to random access resources. Schematically, the network device may also determine whether to allow to report the UL TA information according to at least one of a coverage of the serving cell, a distance between the terminal and a satellite, and a distance between the terminal and the network device. For example, when the network device determines that the coverage of the serving cell is small, the indication information indicates that the UL TA information is not allowed to be reported.

For example, the network device transmits a RRC dedicated signaling to the terminal, where the RRC dedicated signaling carries indication information, and the indication information indicates whether the terminal reports the UL TA information in the message 5. For another example, the network device transmits a system message broadcast to the terminal, where the system message broadcast carries indication information, and the indication information indicates whether the terminal is allowed to report the UL TA information in any of the message 3, the message 5, and the message A.

According to the above, the procedure of receiving and transmitting other messages in the random access procedure will not be repeated herein.

Step 604, the network device receives the UL message transmitted by the terminal in the random access procedure.

Schematically, the UL message may or may not carry the UL TA information of the terminal.

Schematically, the UL TA information includes at least one of: a UL TA, a first RTD between the terminal and a satellite, a second RTD between the terminal and the network device, and a delta value relative to a common RTD.

For example, the network device transmits a RRC dedicated signaling to the terminal, where the RRC dedicated signaling carries indication information, and the indication information indicates that the UL TA information is allowed to be reported in the message 5. The terminal reports the first RTD in the UL message in the random access procedure according to the indication information.

For another example, the network device transmits a system message broadcast to the terminal, where the system message broadcast carries indication information, and the indication information indicates that the UL TA information is not allowed to be reported in any of the message 3, the message 5, and the message A. The terminal will not report the UL TA information in the UL message in the random access procedure according to the indication information.

In conclusion, according to the method provided in these implementations, the network device can dynamically schedule the UL TA information of the terminal by controlling whether to report the TA information. When the network device does not obtain the UL TA information of the terminal, message resources occupied by the terminal for reporting can be reduced, thereby saving resources. When the network device obtains the UL TA information of the terminal, the network device can obtain an exact TA of the terminal, thereby reducing a scheduling delay.

Figure 7:
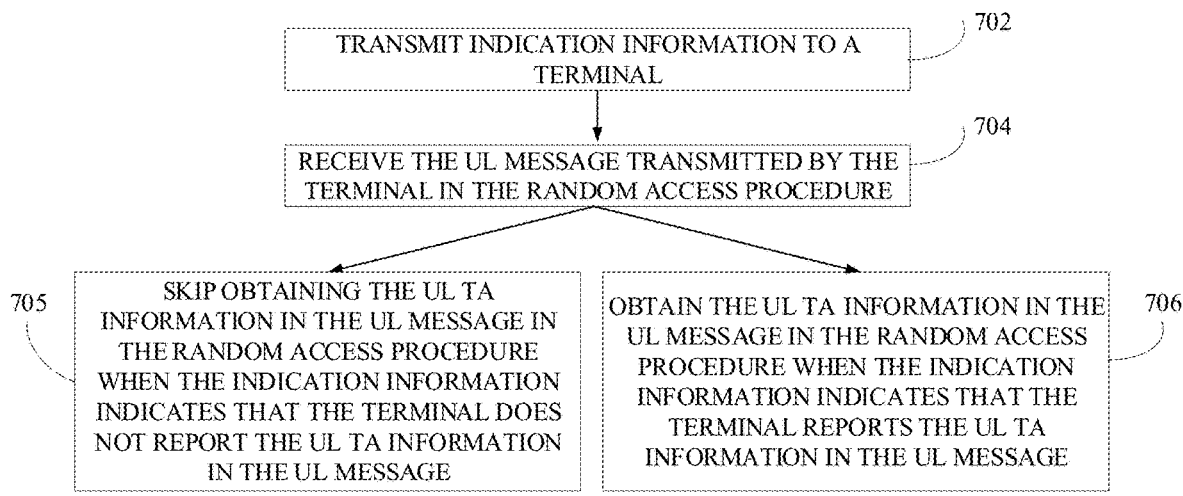
FIG. 7 is a flowchart of a method for TA receiving in an NTN provided in exemplary implementations of the disclosure.

Corresponding to the method for TA reporting in the NTN provided in implementations of the disclosure, schematically, as illustrated in FIGS. 6 and 7, according to the classification of the indication information, the network device may receive the UL message transmitted by the terminal according to at least one of the following two methods.

1. The Indication Information Indicates Whether the Terminal Reports the UL TA Information in the UL Message in the Random Access Procedure.

Schematically, as illustrated in FIG. 7, another method for TA receiving in an NTN is provided in implementations of the disclosure. The method includes the following.

Step 702, a network device transmits indication information to a terminal.

Schematically, the indication information indicates whether the terminal reports UL TA information in a UL message in a random access procedure. Schematically, the indication information is carried in a RRC dedicated signaling or a system message broadcast.

Schematically, the UL message in the random access procedure includes any of: a message 3 in a type-1 random access procedure, a message 5 in the type-1 random access procedure, and a message A in a type-2 random access procedure.

According to the classification of the UL message, the indication information may indicate only a certain message, or indicate all messages. Schematically, the indication information may be classified into the following two types according to different functions.

(1) the Indication Information Indicates a Certain UL Message in the Random Access procedure.

The indication information indicates one of: whether the terminal reports the UL TA information in the message 3, whether the terminal reports the UL TA information in the message 5, or whether the terminal reports the UL TA information in the message A.

(2) the Indication Information Uniformly Indicates all UL Messages or any UL Message in the Random Access Procedure.

The indication information indicates whether the terminal reports the UL TA information in any of the message 3, the message 5, and the message A.

According to the above, the procedure of receiving and transmitting other messages in the random access procedure will not be repeated herein.

Step 704, the network device receives the UL message transmitted by the terminal in the random access procedure.

Schematically, the UL message may or may not carry the UL TA information of the terminal.

Schematically, the UL TA information includes at least one of: a UL TA, a first RTD between the terminal and a satellite, a second RTD between the terminal and the network device, and a delta value relative to a common RTD.

For example, the network device transmits a RRC dedicated signaling to the terminal, where the RRC dedicated signaling carries indication information, and the indication information indicates that the terminal reports the UL TA information in the message A. The terminal reports the first RTD in the UL message, i.e., in the message A, in the random access procedure according to the indication information.

For another example, the network device transmits a system message broadcast to the terminal, where the system message broadcast carries indication information, and the indication information indicates that the terminal does not report the UL TA information in any of the message 3, the message 5, and the message A. The terminal will not report the UL TA information in the UL message in the random access procedure according to the indication information.

Step 705, the network device skips obtaining the UL TA information in the UL message in the random access procedure when the indication information indicates that the terminal does not report the UL TA information in the UL message.

Step 706, the network device obtains the UL TA information in the UL message in the random access procedure when the indication information indicates that the terminal reports the UL TA information in the UL message.

Schematically, only one of step 705 and step 706 can be executed, step 705 and step 706 cannot be executed at the same time. Alternatively, step 705 is executed first, and then step 706 is executed according to updated indication information. Alternatively, step 706 is executed first, and then step 705 is executed according to updated indication information.

2. The Indication Information Indicates Whether the Terminal is Allowed to Report the UL TA Information in the UL Message in the Random Access Procedure.

Figure 8:
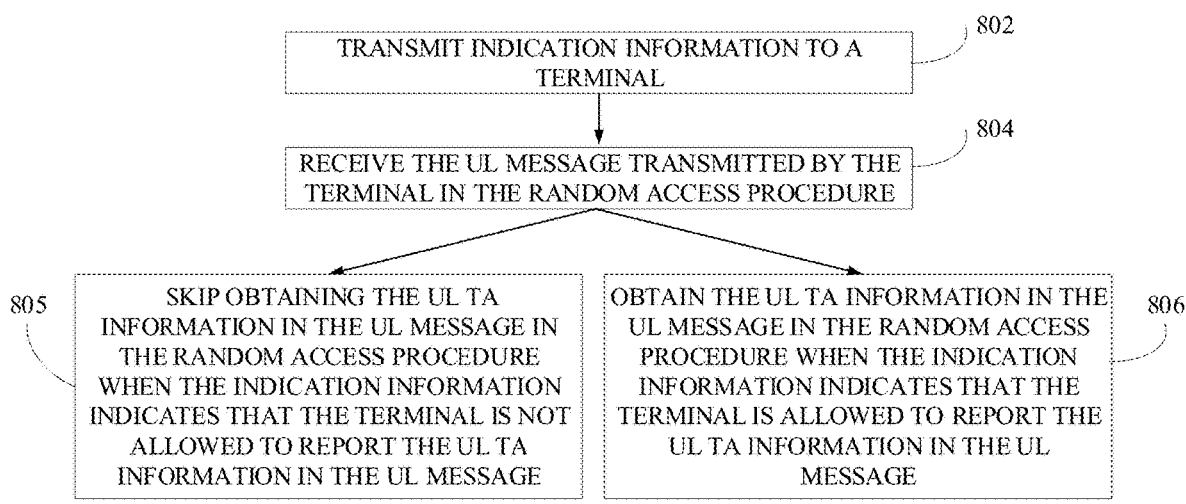
FIG. 8 is a flowchart of a method for TA receiving in an NTN provided in exemplary implementations of the disclosure.

Schematically, as illustrated in FIG. 8, another method for TA receiving in an NTN is provided in implementations of the disclosure. The method includes the following.

Step 802, a network device transmits indication information to a terminal.

Schematically, the indication information indicates whether the terminal reports UL TA information in a UL message in a random access procedure or whether the terminal is allowed to report the UL TA information in the UL message in the random access procedure. Schematically, the indication information is carried in a RRC dedicated signaling or a system message broadcast.

Schematically, the UL message in the random access procedure includes any of: a message 3 in a type-1 random access procedure, a message 5 in the type-1 random access procedure, and a message A in a type-2 random access procedure.

According to the classification of the UL message, the indication information may indicate only a certain message, or indicate all messages. Schematically, the indication information may be classified into the following two types according to different functions.

(1) the Indication Information Indicates a Certain UL Message in the Random Access Procedure.

The indication information indicates one of: whether the terminal is allowed to report the UL TA information in the message 3, whether the terminal is allowed to report the UL TA information in the message 5, or whether the terminal is allowed to report the UL TA information in the message A.

(2) the Indication Information Uniformly Indicates all UL Messages or any UL Message in the Random Access Procedure.

The indication information indicates whether the terminal is allowed to report the UL TA information in any of the message 3, the message 5, and the message A.

According to the above, the procedure of receiving and transmitting other messages in the random access procedure will not be repeated herein.

Step 804, the network device receives the UL message transmitted by the terminal in the random access procedure.

Schematically, the UL message may or may not carry the UL TA information of the terminal.

Schematically, the UL TA information includes at least one of: a UL TA, a first RTD between the terminal and a satellite, a second RTD between the terminal and the network device, and a delta value relative to a common RTD.

Step 805, the network device skips obtaining the UL TA information in the UL message in the random access procedure when the indication information indicates that the UL TA information is not allowed to be reported in the UL message.

Step 806, the network device obtains the UL TA information in the UL message in the random access procedure when the indication information indicates that the UL TA information is allowed to be reported in the UL message.

Schematically, when the indication information indicates that the UL TA information is allowed to be reported in the UL message, in the UL message in the random access procedure, the terminal can make the following two decisions respectively according to at least one of the logical channel priority and the UL grant.

(1) the Terminal Reports the UL TA Information in the Following Cases.

All the data to-be-transmitted are sorted in descending order of the priority of the logical channel to which the UL TA information and the other data to-be-transmitted belong. Whether a UL resource scheduled by the UL grant is large enough to accommodate the UL TA information in the current UL transmission is determined according to the size of respective sorted data to-be-transmitted. When the UL resource indicated by the UL grant is large enough to accommodate the UL TA information, the UL TA information is reported.

The data to-be-transmitted includes at least one of UL data and a MAC CE, and the UL TA information is carried in a certain MAC CE.

(2) the Terminal Skips Reporting the UL TA Information in the Following Cases.

All the data to-be-transmitted are sorted in descending order of the priority of the logical channel to which the UL TA information and the other data to-be-transmitted belong. Whether a UL resource scheduled by the UL grant is large enough to accommodate the UL TA information in the current UL transmission is determined according to the size of respective sorted data to-be-transmitted. When the UL resource indicated by the UL grant is too small to accommodate the UL TA information, the UL TA information will not be reported.

Schematically, only one of step 805 and step 806 can be executed, step 805 and step 806 cannot be executed at the same time. Alternatively, step 805 is executed first, and then step 806 is executed according to updated indication information. Alternatively, step 806 is executed first, and then step 805 is executed according to updated indication information.

In conclusion, according to the method provided in these implementations, the network device can dynamically schedule the UL TA information of the terminal by controlling whether to report the TA information. When the network device does not obtain the UL TA information of the terminal, message resources occupied by the terminal for reporting can be reduced, thereby saving resources. When the network device obtains the UL TA information of the terminal, the network device can obtain an exact TA of the terminal, thereby reducing a scheduling delay.

Figure 9:
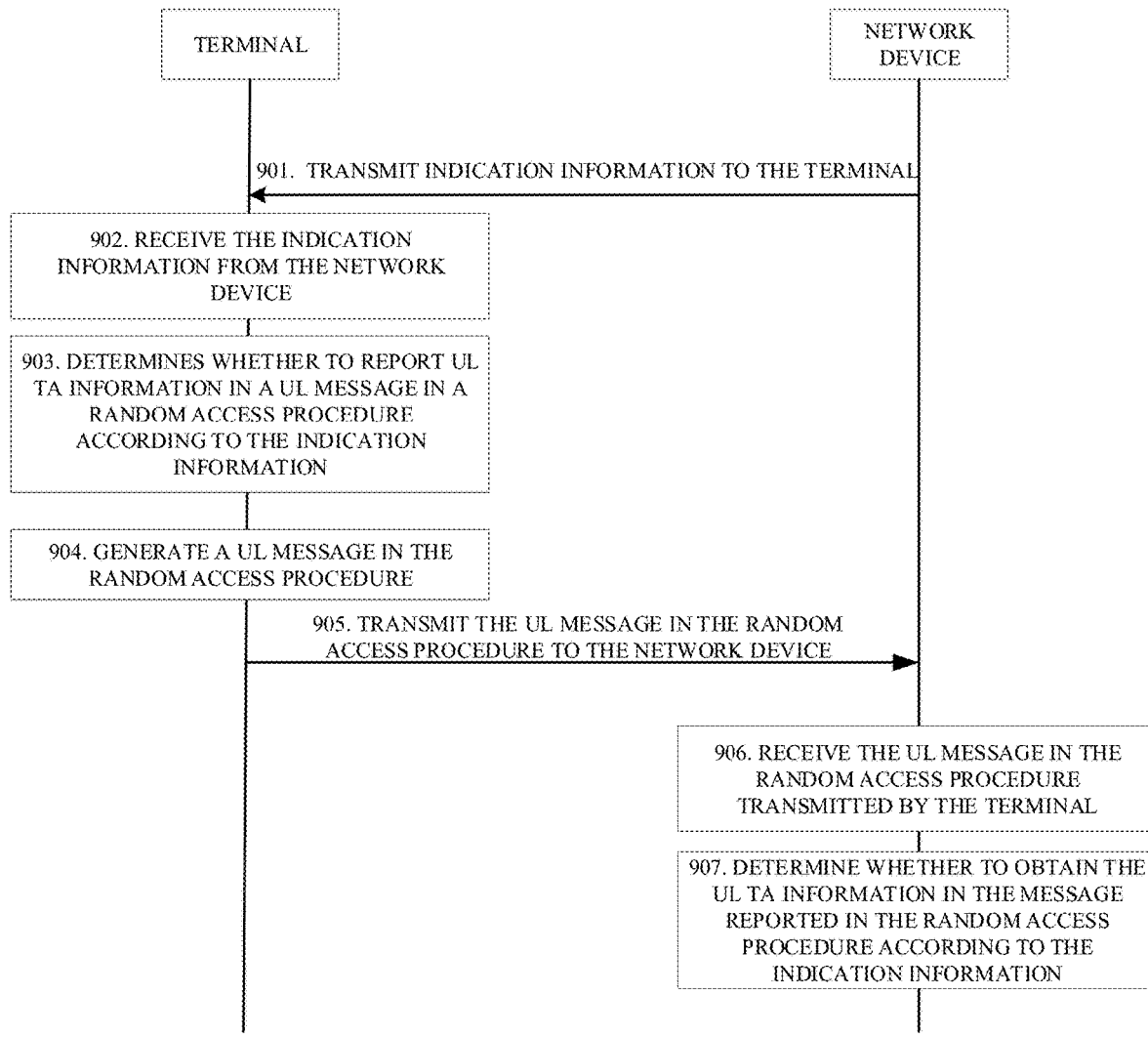
FIG. 9 is a flowchart of a method for TA reporting/receiving in an NTN provided in exemplary implementations of the disclosure.

Schematically, as illustrated in FIG. 9, a method for TA reporting/receiving in an NTN is provided in implementations of the disclosure. In these implementations, for example, the method is performed by a terminal and a network device. The method includes the following.

Step 901, the network device transmits indication information to the terminal.

Step 902, the terminal receives the indication information from the network device.

Step 903, the terminal determines whether to report UL TA information in a UL message in a random access procedure according to the indication information.

Step 904, the terminal generates a UL message in the random access procedure.

Schematically, the indication information indicates whether the terminal reports the UL TA information in the UL message in the random access procedure or whether the terminal is allowed to report the UL TA information in the UL message in the random access procedure.

Schematically, the UL message in the random access procedure includes any of: a message 3 in a type-1 random access procedure, a message 5 in the type-1 random access procedure, and a message A in a type-2 random access procedure.

According to the classification of the UL message, the indication information may indicate only a certain message, or indicate all messages. Schematically, the indication information may be classified into the following two types according to different functions.

(1) the Indication Information Indicates a Certain Message.

The indication information indicates any of: that the terminal reports the UL TA information in the message 3, that the terminal reports the UL TA information in the message 5, that the terminal reports the UL TA information in the message A, whether the terminal is allowed to report the UL TA information in the message 3, whether the terminal is allowed to report the UL TA information in the message 5, or whether the terminal is allowed to report the UL TA information in the message A.

(2) the Indication Information Uniformly Indicates all Messages.

The indication information indicates that the terminal reports the UL TA information in any of the message 3, the message 5, and the message A, or whether the terminal is allowed to report the UL TA information in any of the message 3, the message 5, and the message A.

For example, the network device transmits a RRC dedicated signaling to the terminal, where the RRC dedicated signaling carries indication information, and the indication information indicates that the UL TA information is allowed to be reported in the message 3. After receiving the indication information, the terminal determines that the UL TA information needs to be reported in the UL message in the random access procedure according to the indication information, and generates the UL message containing the UL TA information.

Step 905, the terminal transmits the UL message in the random access procedure to the network device.

Step 906, the network device receives the UL message in the random access procedure transmitted by the terminal.

Step 907, the network device determines whether to obtain the UL TA information in the message reported in the random access procedure according to the indication information.

Schematically, the UL TA information includes at least one of: a UL TA, a first RTD between the terminal and a satellite, a second RTD between the terminal and the network device, and a delta value relative to a common RTD.

For example, according to the indication information indicating that the UL TA information is allowed to be reported in the message 5, the terminal generates the UL message of the random access procedure. Subsequently, the terminal transmits the UL message to the network device, where the UL TA information in the UL message is the second RTD.

Schematically, as illustrated in FIG. 8, for example, the random access procedure is a type-2 random access procedure, a procedure of TA reporting/receiving in an NTN is classified into the following two cases according to whether the network device allows the terminal to report the UL TA information in message A.

Case 1: The Network Device does not Allow the Terminal to Report the UL TA Information in the Message A.

Figure 10:
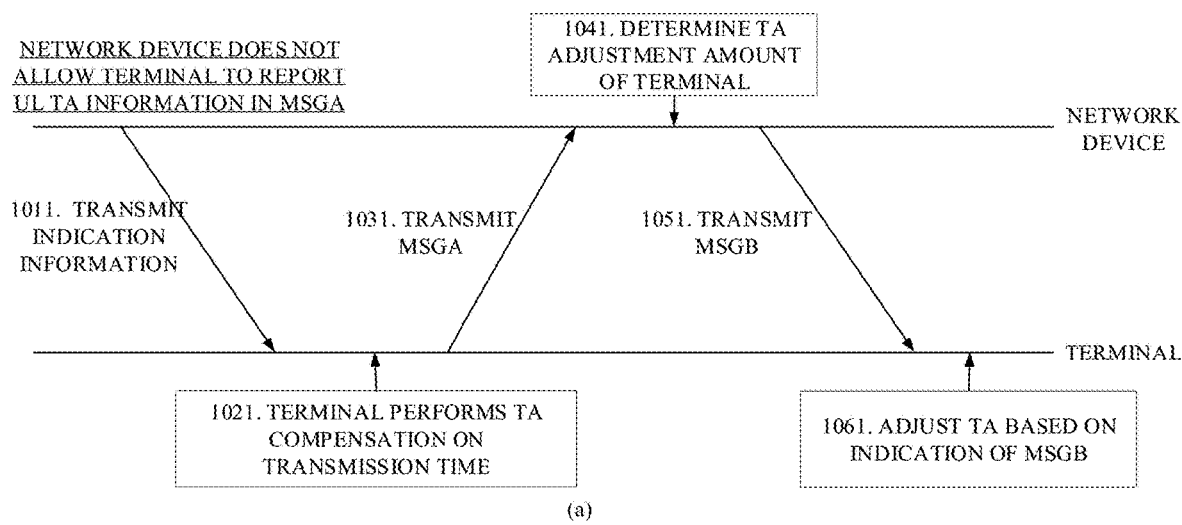
FIG. 10 is a schematic diagram illustrating a procedure of TA reporting and receiving in an NTN provided in exemplary implementations of the disclosure.
Figure 10:
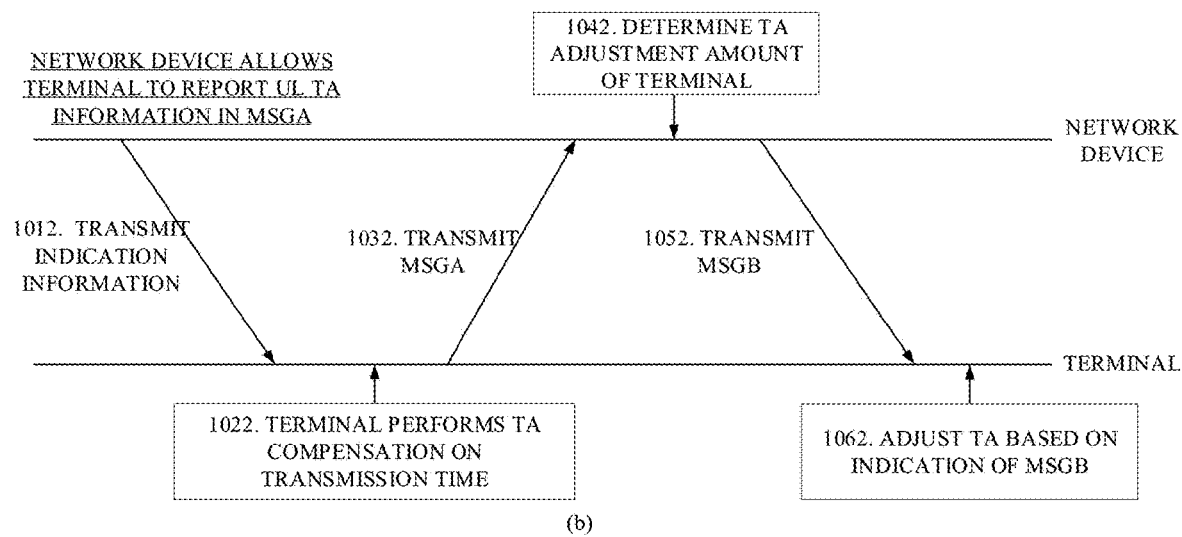

Schematically, as illustrated in (a) of FIG. 10, the TA reporting/receiving in the NTN includes the following.

Step 1011, a network device transmits indication information to a terminal.

Schematically, the indication information indicates that the terminal is not allowed to report UL TA information of the terminal in a UL message, i.e., in message A, in a random access procedure.

Step 1021, the terminal performs TA compensation on a transmission time of the UL message.

Step 1031, the terminal transmits the message A to the network device.

The terminal performs the TA compensation on the transmission time according to an estimated pre-compensation value, and transmits the message A to the network device at the transmission time after the TA compensation. The network device does not allow the terminal to report the UL TA information in the message A. Therefore, the UL message generated by the terminal does not contain the UL TA information. That is, a MAC CE carrying the UL TA information of the terminal is not reported in the message A transmitted by the terminal to the network device.

Step 1041, the network device determines a TA adjustment amount of the terminal.

Step 1051, the network device transmits message B to the terminal.

According to the message A reported by the terminal, a MAC CE obtained by the network device does not carry the UL TA information of the terminal. According to the message A, the network device adjusts a TA of the terminal and generates and transmits the message B to the terminal, where the TA of the terminal carried in the message B has not been adjusted according to the UL TA information of the terminal.

Step 1061, the terminal adjusts the TA based on the indication of the message B.

After receiving the message B transmitted by the network device, the terminal adjusts the transmission time of the UL message of the terminal according to the TA value carried in the message B.

Case 2: The Network Device Allows the Terminal to Report the UL TA Information in the Message A.

Schematically, as illustrated in (b) of FIG. 10, the TA reporting/receiving in the NTN includes the following.

Step 1012, a network device transmits indication information to a terminal.

Schematically, the indication information indicates that the terminal is allowed to report UL TA information of the terminal in a UL message, i.e., in message A, in a random access procedure.

Step 1022, the terminal performs TA compensation on a transmission time of the UL message.

The terminal performs the TA compensation on the transmission time according to an estimated pre-compensation value, and transmits the message A to the network device at the transmission time after the TA compensation. The network device allows the terminal to report the UL TA information in the message A. Therefore, the UL message generated by the terminal may contain the UL TA information. That is, a MAC CE carrying the UL TA information of the terminal may be reported in the message A transmitted by the terminal to the network device.

Step 1042, a TA adjustment amount of the terminal is determined.

Step 1052, the network device transmits message B to the terminal.

According to the message A reported by the terminal, a MAC CE obtained by the network device carries the UL TA information of the terminal. According to the message A, the network device adjusts a TA of the terminal and generates and transmits the message B, where the TA of the terminal carried in the message B is a TA adjusted according to the UL TA information of the terminal.

Step 1062, the terminal adjusts the TA based on the indication of the message B.

After receiving the message B transmitted by the network device, the terminal adjusts the transmission time of the UL message of the terminal according to the TA value carried in the message B.

In conclusion, according to the method for TA reporting/receiving in the NTN provided in implementations, the network device can dynamically schedule the UL TA information of the terminal by controlling whether to report the TA information. When the network device does not obtain the UL TA information of the terminal, message resources occupied by the terminal for reporting can be reduced, thereby saving resources. When the network device obtains the UL TA information of the terminal, the network device can obtain an exact TA of the terminal, thereby reducing a scheduling delay.

Figure 11:
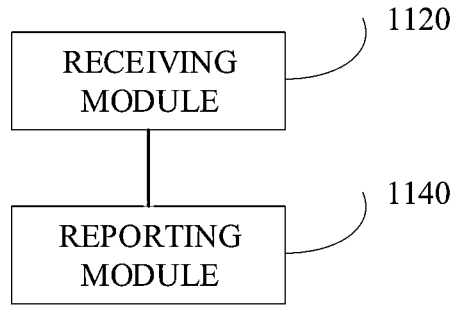
FIG. 11 is a schematic structural diagram of an apparatus for TA reporting in an NTN provided in exemplary implementations of the disclosure.

Schematically, as illustrated in FIG. 11, an apparatus for TA reporting in an NTN is provided in implementations of the disclosure. The apparatus can be implemented as all or part of or be applied in a terminal. The terminal may support the NTN. The apparatus includes a receiving module 1120 and a reporting module 1140.

The receiving module 1120 is configured to receive indication information from a network device, where the indication information indicates whether a terminal reports UL TA information in a UL message in a random access procedure or whether the terminal is allowed to report the UL TA information in the UL message in the random access procedure. The reporting module 1140 is configured to report or skip reporting the UL TA information in the UL message in the random access procedure according to the indication information.

In optional implementations, the UL message in the random access procedure includes any of: a message 3 in a type-1 random access procedure, a message 5 in the type-1 random access procedure, and a message A in a type-2 random access procedure.

In optional implementations, the indication information indicates one of: whether the terminal reports the UL TA information in the message 3, whether the terminal reports the UL TA information in the message 5, whether the terminal reports the UL TA information in the message A, whether the terminal is allowed to report the UL TA information in the message 3, whether the terminal is allowed to report the UL TA information in the message 5, or whether the terminal is allowed to report the UL TA information in the message A.

In optional implementations, the indication information indicates whether the terminal reports the UL TA information in any of the message 3, the message 5, and the message A, or whether the terminal is allowed to report the UL TA information in any of the message 3, the message 5, and the message A.

In optional implementations, the indication information is carried in a RRC dedicated signaling or a system message broadcast.

In optional implementations, the UL TA information includes at least one of: a UL TA, a first RTD between the terminal and a satellite, a second RTD between the terminal and the network device, and a delta value relative to a common RTD.

In optional implementations, the reporting module 1140 is further configured to: skip reporting the UL TA information in the UL message in the random access procedure when the indication information indicates that the terminal does not report the UL TA information in the UL message, or report the UL TA information in the UL message in the random access procedure when the indication information indicates that the terminal reports the UL TA information in the UL message.

In optional implementations, the reporting module 1140 is further configured to: skip reporting the UL TA information in the UL message in the random access procedure when the indication information indicates that the terminal is not allowed to report the UL TA information in the UL message, or determine whether to report the UL TA information in the UL message in the random access procedure according to at least one of a logical channel priority and a UL grant when the indication information indicates that the terminal is allowed to report the UL TA information in the UL message.

Figure 12:
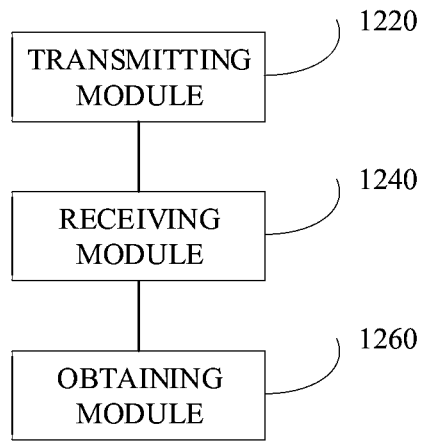
FIG. 12 is a schematic structural diagram of an apparatus for TA receiving in an NTN provided in exemplary implementations of the disclosure.

Schematically, as illustrated in FIG. 12, an apparatus for TA receiving in an NTN is provided in implementations of the disclosure. The apparatus can be implemented as all or part of or be applied in a network device. The apparatus includes a transmitting module 1220, a receiving module 1240, and an obtaining module 1260.

The transmitting module 1220 is configured to transmit indication information to a terminal, where the indication information indicates whether the terminal reports UL TA information in a UL message in a random access procedure or whether the terminal is allowed to report the UL TA information in the UL message in the random access procedure. The receiving module 1240 is configured to receive the UL message transmitted by the terminal in the random access procedure. The obtaining module 1260 is configured to: skip obtaining the UL TA information in the UL message in the random access procedure when the indication information indicates that the terminal does not report the UL TA information in the UL message, or obtain the UL TA information in the UL message in the random access procedure when the indication information indicates that the terminal reports the UL TA information in the UL message.

In optional implementations, the UL message in the random access procedure includes any of: a message 3 in a type-1 random access procedure, a message 5 in the type-1 random access procedure, and a message A in a type-2 random access procedure.

In optional implementations, the indication information indicates one of: whether the terminal reports the UL TA information in the message 3, whether the terminal reports the UL TA information in the message 5, whether the terminal reports the UL TA information in the message A, whether the terminal is allowed to report the UL TA information in the message 3, whether the terminal is allowed to report the UL TA information in the message 5, or whether the terminal is allowed to report the UL TA information in the message A.

In optional implementations, the indication information indicates whether the terminal reports the UL TA information in any of the message 3, the message 5, and the message A, or whether the terminal is allowed to report the UL TA information in any of the message 3, the message 5, and the message A.

In optional implementations, the indication information is carried in a RRC dedicated signaling or a system message broadcast.

In optional implementations, the UL TA information includes at least one of: a UL TA, a first RTD between the terminal and a satellite, a second RTD between the terminal and the network device, and a delta value relative to a common RTD.

In optional implementations, the obtaining module 1260 is further configured to: skip obtaining the UL TA information in the UL message in the random access procedure when the indication information indicates that the terminal is not allowed to report the UL TA information in the UL message, or obtain the UL TA information in the UL message in the random access procedure when the indication information indicates that the terminal is allowed to report the UL TA information in the UL message.

Figure 13:
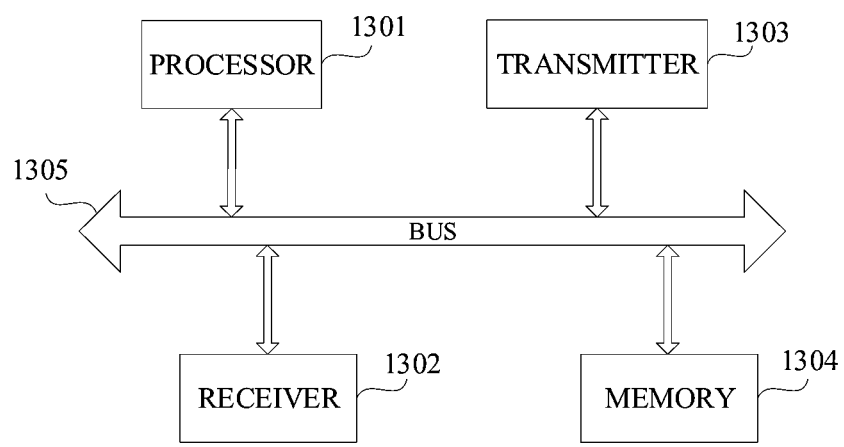
FIG. 13 is a block diagram of a communication device provided in exemplary implementations of the disclosure.

FIG. 13 illustrates a schematic structural diagram of a communication device (a terminal or a network device) provided in exemplary implementations of the disclosure.

The communication device includes a processor 1301, a receiver 1302, a transmitter 1303, a memory 1304, and a bus 1305.

The processor 1301 includes one or more processing cores. The processor 1301 performs various functional applications and information processing by running software programs and modules.

The receiver 1302 and the transmitter 1303 may be implemented as a communication component. The communication component may be a communication chip.

The memory 1304 is connected with the processor 1301 via the bus 1305.

The memory 1304 may be configured to store at least one instruction, and the processor 1301 is configured to execute the at least one instruction to implement various steps of the method for TA reporting and receiving in an NTN mentioned in foregoing method implementations.

In addition, the memory 1304 may be implemented by any type of volatile or non-volatile storage devices or combinations thereof. The volatile or non-volatile storage devices includes, but are not limited to: a magnetic disk or an optical disk, an electrically-erasable programmable read only memory (EEPROM), an erasable programmable ROM (EPROM), a static random access memory (SRAM), a ROM, a magnetic memory, a flash memory, a programmable ROM (PROM).

According to an aspect of the disclosure, a terminal is provided. The terminal includes a processor, a transceiver connected with the processor, and a memory configured to store executable instructions for the processor. The processor is configured to load and execute the executable instructions to perform the method for TA reporting in the NTN described above.

According to an aspect of the disclosure, a network device is provided. The network device includes a processor, a transceiver connected with the processor, and a memory configured to store executable instructions for the processor. The processor is configured to load and execute the executable instructions to perform the method for TA receiving in the NTN described above.

According to an aspect of the disclosure, a chip is provided. The chip includes a programmable logic circuit or program. The chip is configured to perform the method for TA reporting in the NTN or the method for TA receiving in the NTN according to the above aspect.

In exemplary implementations of the disclosure, a computer-readable storage medium is further provided. The computer-readable storage medium stores executable instructions. The executable instructions are loaded and executed by a processor to perform the method for TA reporting in the NTN or the method for TA receiving in the NTN described above.

Those of ordinary skill in the art may understand that all or part of the steps for implementing the above implementations may be accomplished by hardware or by means of a program to instruct associated hardware. The program may be stored in a computer-readable storage medium. The storage medium mentioned may be a ROM, a magnetic disk, an optical disk, and the like.

The above are only optional implementations of the disclosure, which are not intended to limit the disclosure. Any modification, equivalent substitution, improvement, etc., made within the spirit and principles of the disclosure shall fall within the protection scope of the disclosure.

What is claimed is:

1. A method for timing advance (TA) reporting in a non-terrestrial network (NTN), being applied to a terminal and comprising:
   receiving indication information from a network device, wherein the indication information indicates that the terminal is to or not to report uplink (UL) TA information in a message 5 in a type-1 random access procedure; and
   reporting, by the terminal, the UL TA information in the message 5 in the type-1 random access procedure when the indication information indicates that the terminal is to report the UL TA information in the message 5 in the type-1 random access procedure; or
   skipping reporting, by the terminal, the UL TA information in the message 5 in the type-1 random access procedure when the indication information indicates that the terminal is not to report the UL TA information in the message 5 in the type-1 random access procedure.

2. The method of claim 1, wherein the indication information is carried in a radio resource control (RRC) dedicated signaling or a system message broadcast.

3. The method of claim 1, wherein the UL TA information comprises at least one of:
   a UL TA;
   a first round trip delay (RTD) between the terminal and a satellite;
   a second RTD between the terminal and the network device; and
   a delta value relative to a common RTD.

4. A method for timing advance (TA) receiving in a non-terrestrial network (NTN), being applied to a network device and comprising:
   transmitting indication information to a terminal, wherein the indication information indicates that the terminal is to or not to report uplink (UL) TA information in a message 5 in a type-1 random access procedure; and
   receiving the message 5 UL message transmitted by the terminal in the type-1 random access procedure.

5. The method of claim 4, wherein the indication information is carried in a radio resource control (RRC) dedicated signaling or a system message broadcast.

6. The method of claim 4, wherein the UL TA information comprises at least one of:
   a UL TA;
   a first round trip delay (RTD) between the terminal and a satellite;
   a second RTD between the terminal and the network device; and
   a delta value relative to a common RTD.

7. A network device comprising a processor, a transceiver connected with the processor, and a memory configured to store executable instructions, the processor being configured to load and execute the executable instructions to perform the method of claim 4.

8. A terminal, comprising:
   a processor;
   a transceiver connected with the processor; and
   a memory configured to store executable instructions, wherein the processor is configured to load and execute the executable instructions to cause the transceiver to:
   receive indication information from a network device, wherein the indication information indicates that the terminal is to or not to report uplink (UL) timing advance (TA) information in a message 5 in a type-1 random access procedure; and
   report the UL TA information in the message 5 in the type-1 random access procedure when the indication information indicates that the terminal is to report the UL TA information in the message 5 in the type-1 random access procedure; or
   skip reporting the UL TA information in the message 5 in the type-1 random access procedure when the indication information indicates that the terminal is not to report the UL TA information in the message 5 in the type-1 random access procedure.

9. The terminal of claim 8, wherein the indication information is carried in a radio resource control (RRC) dedicated signaling or a system message broadcast.

10. The terminal of claim 8, wherein the UL TA information comprises at least one of:
    a UL TA;
    a first round trip delay (RTD) between the terminal and a satellite;
    a second RTD between the terminal and the network device; and
    a delta value relative to a common RTD.

* * * * *